(12) United States Patent
Jeong et al.

(10) Patent No.: US 11,201,501 B2
(45) Date of Patent: Dec. 14, 2021

(54) ELECTROMAGNETIC INDUCTIVE POWER SUPPLY APPARATUS

(71) Applicant: AMOSENSE CO., LTD, Cheonan-si (KR)

(72) Inventors: Sang Dong Jeong, Gimpo-si (KR); Jin-Pyo Park, Seoul (KR); Won-San Na, Seoul (KR)

(73) Assignee: AMOSENSE CO., LTD, Chungcheongnam-do (KR)

( * ) Notice: Subject to any disclaimer, the term of this patent is extended or adjusted under 35 U.S.C. 154(b) by 134 days.

(21) Appl. No.: 16/646,890

(22) PCT Filed: Sep. 12, 2018

(86) PCT No.: PCT/KR2018/010700
§ 371 (c)(1),
(2) Date: Mar. 12, 2020

(87) PCT Pub. No.: WO2019/054754
PCT Pub. Date: Mar. 21, 2019

(65) Prior Publication Data
US 2020/0336007 A1   Oct. 22, 2020

(30) Foreign Application Priority Data
Sep. 15, 2017   (KR) .......................... 10-2017-0118293

(51) Int. Cl.
*H02J 50/10* (2016.01)
(52) U.S. Cl.
CPC .................................... *H02J 50/10* (2016.02)

(58) Field of Classification Search
CPC ......... H02J 50/10; H02J 50/005; H02J 50/001
See application file for complete search history.

(56) References Cited

U.S. PATENT DOCUMENTS

| | | | | |
|---|---|---|---|---|
| 5,426,360 A | * | 6/1995 | Maraio | ................ G01R 15/142 324/126 |
| 7,777,605 B2 | * | 8/2010 | Zumoto | .................. H01F 38/30 336/178 |
| 2014/0084866 A1 | | 3/2014 | Yu | |

FOREIGN PATENT DOCUMENTS

| | | |
|---|---|---|
| JP | 5-45384 A | 2/1993 |
| KR | 20-0400716 Y1 | 11/2005 |
| KR | 2012-0075857 A | 7/2012 |
| KR | 2015-0071430 A | 6/2015 |
| KR | 2015-0077918 A | 7/2015 |
| KR | 2016-0031663 A | 3/2016 |

* cited by examiner

*Primary Examiner* — Nghia M Doan
(74) *Attorney, Agent, or Firm* — CL Intellectual LLC

(57) ABSTRACT

An embodiment of the present disclosure provides an electromagnetic inductive power supply apparatus comprising: an upper housing disposed on the upper side of a lower housing and having an elevating guide; a base disposed above the upper housing; a pressing support disposed on the lower side of the base part and having a guide bar which is coupled to the elevating guide so as to move up and down while being guided by the elevating guide, and one end of which is fastened to the lower housing; a lower core installed in the lower housing; and an upper core installed in the upper housing and forming a magnetic circuit inner space through which a line passes when the upper core is connected to the lower core.

20 Claims, 9 Drawing Sheets

[FIG. 1]
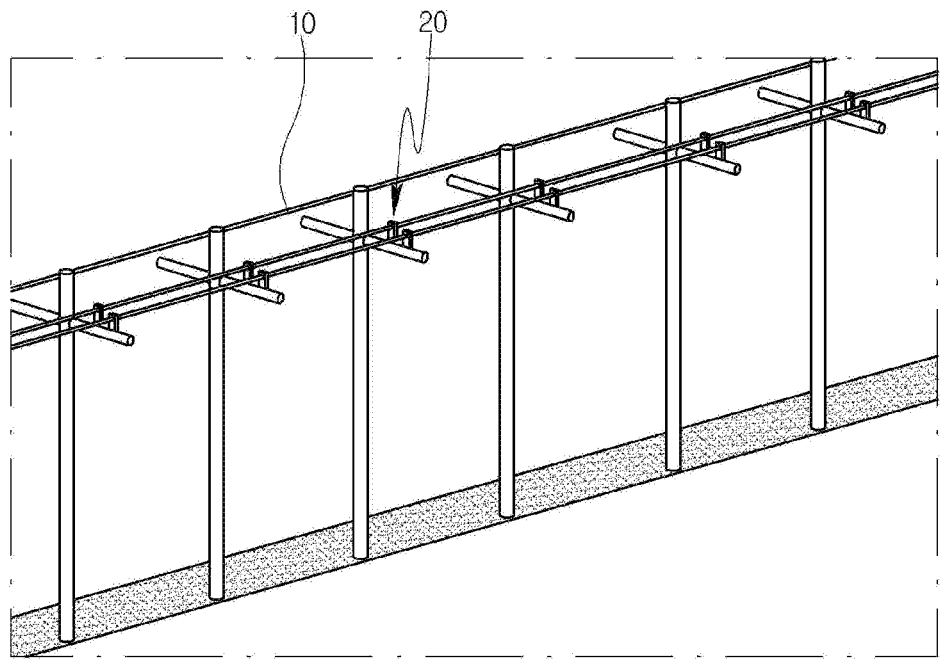

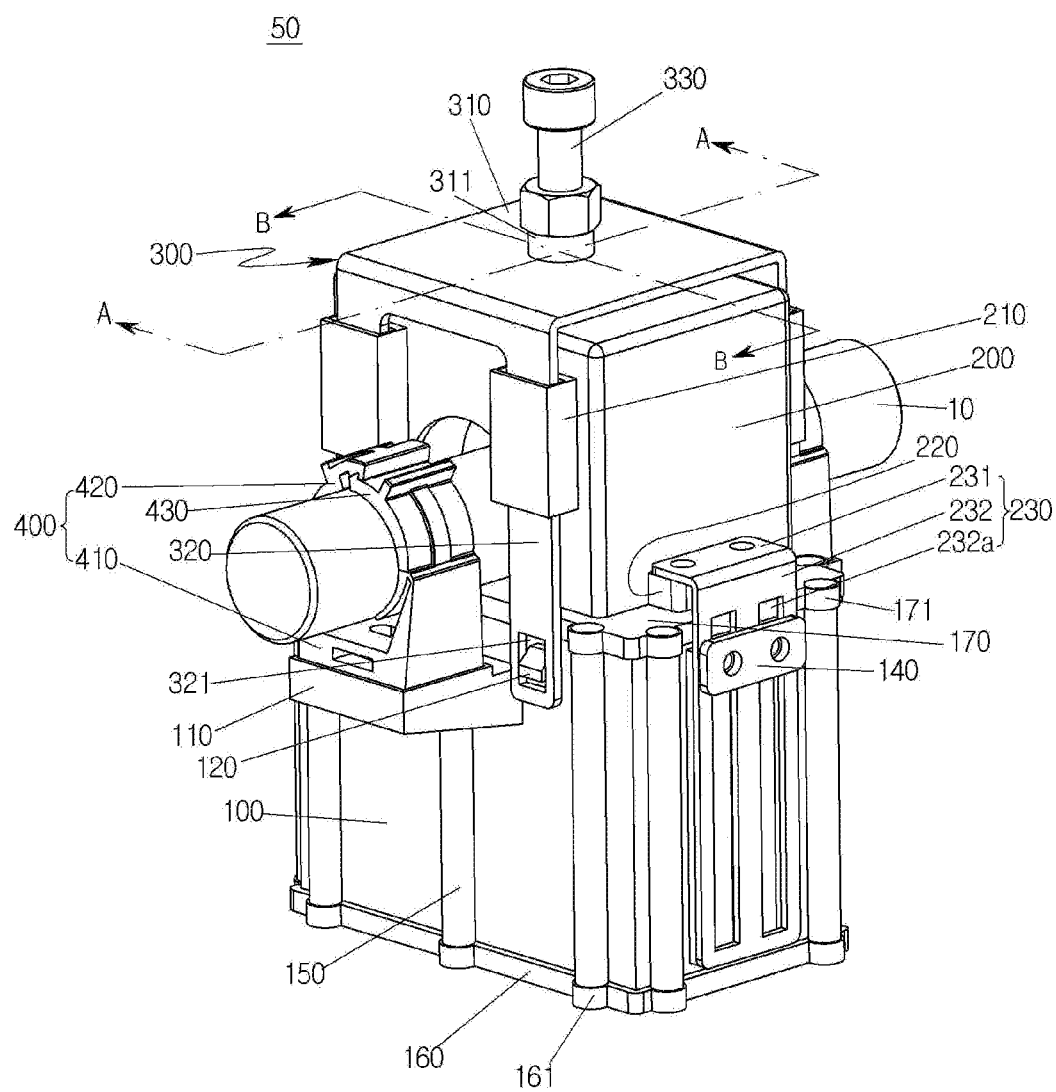
[FIG. 2]

[FIG. 3]
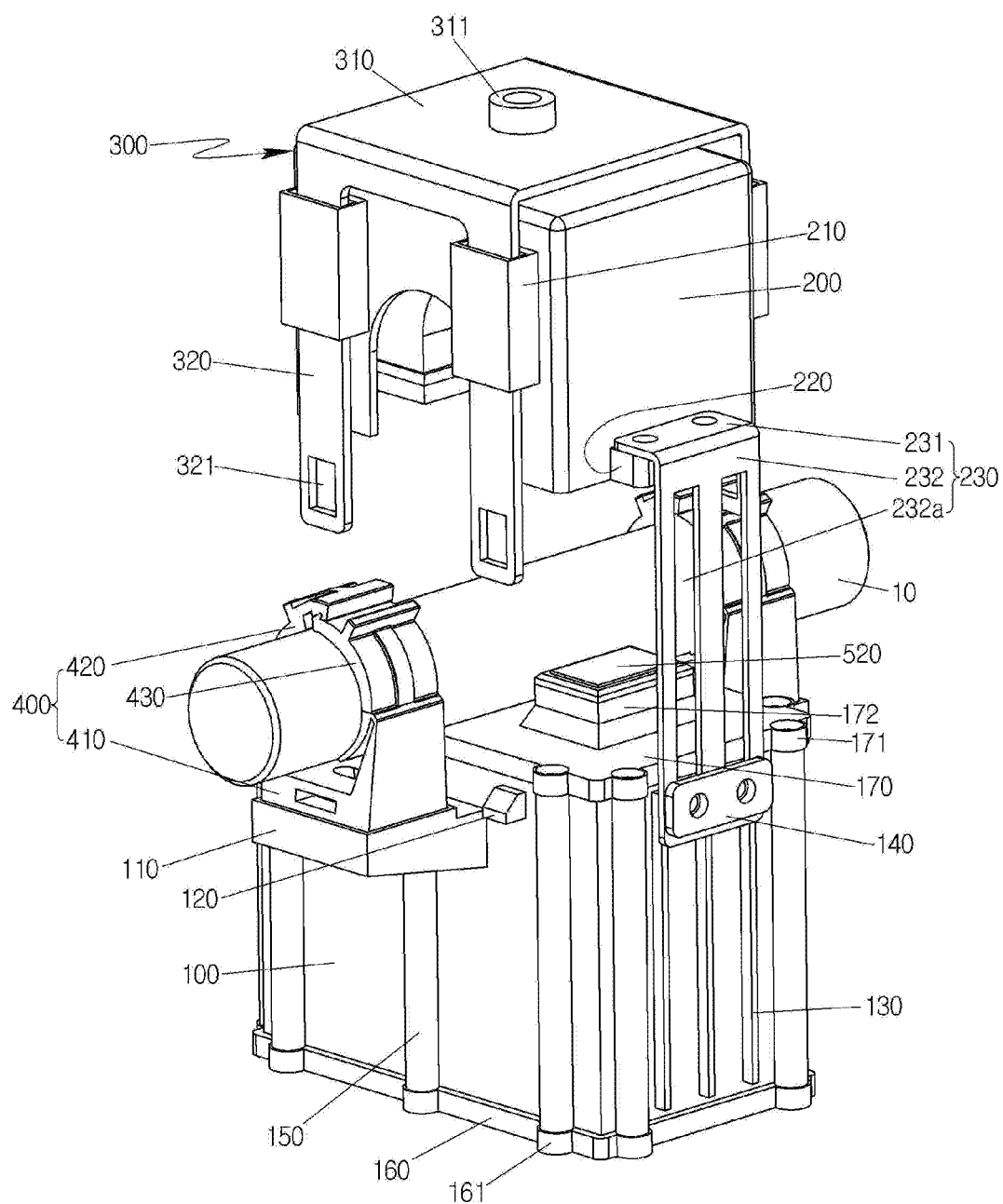

[FIG. 4]
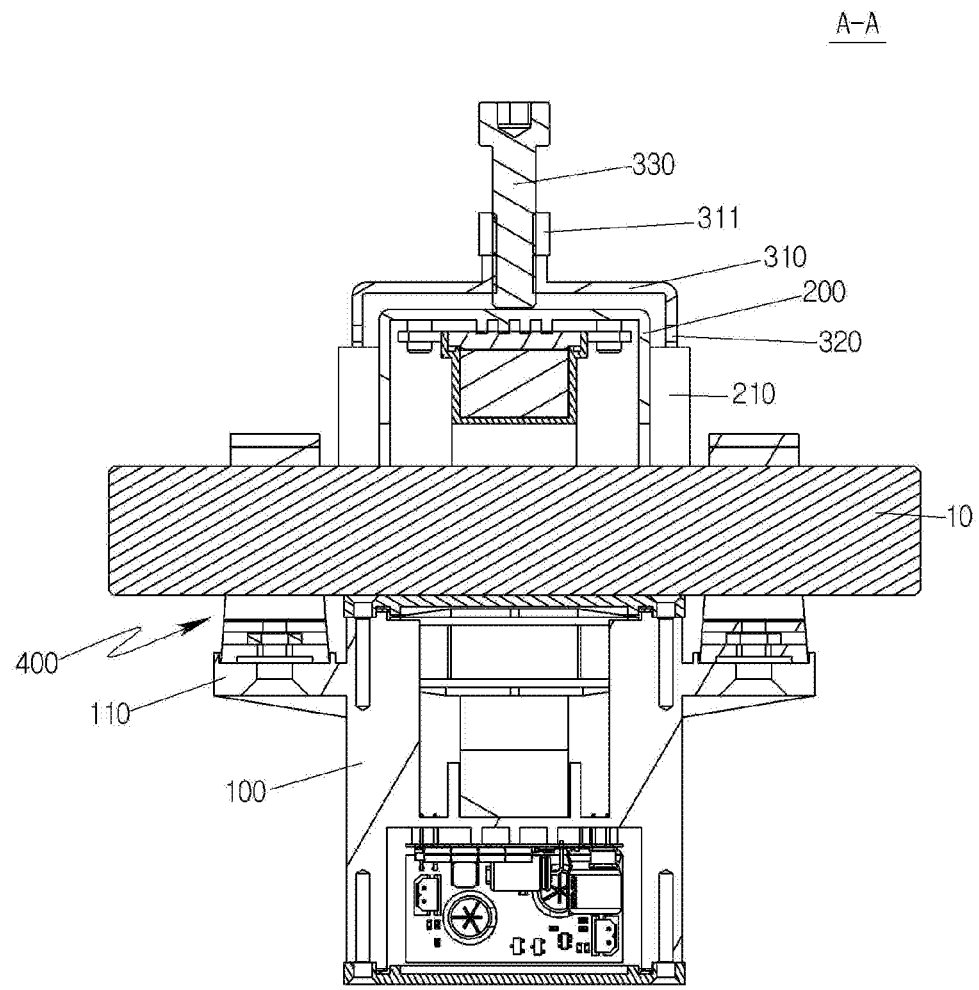

[FIG. 5]
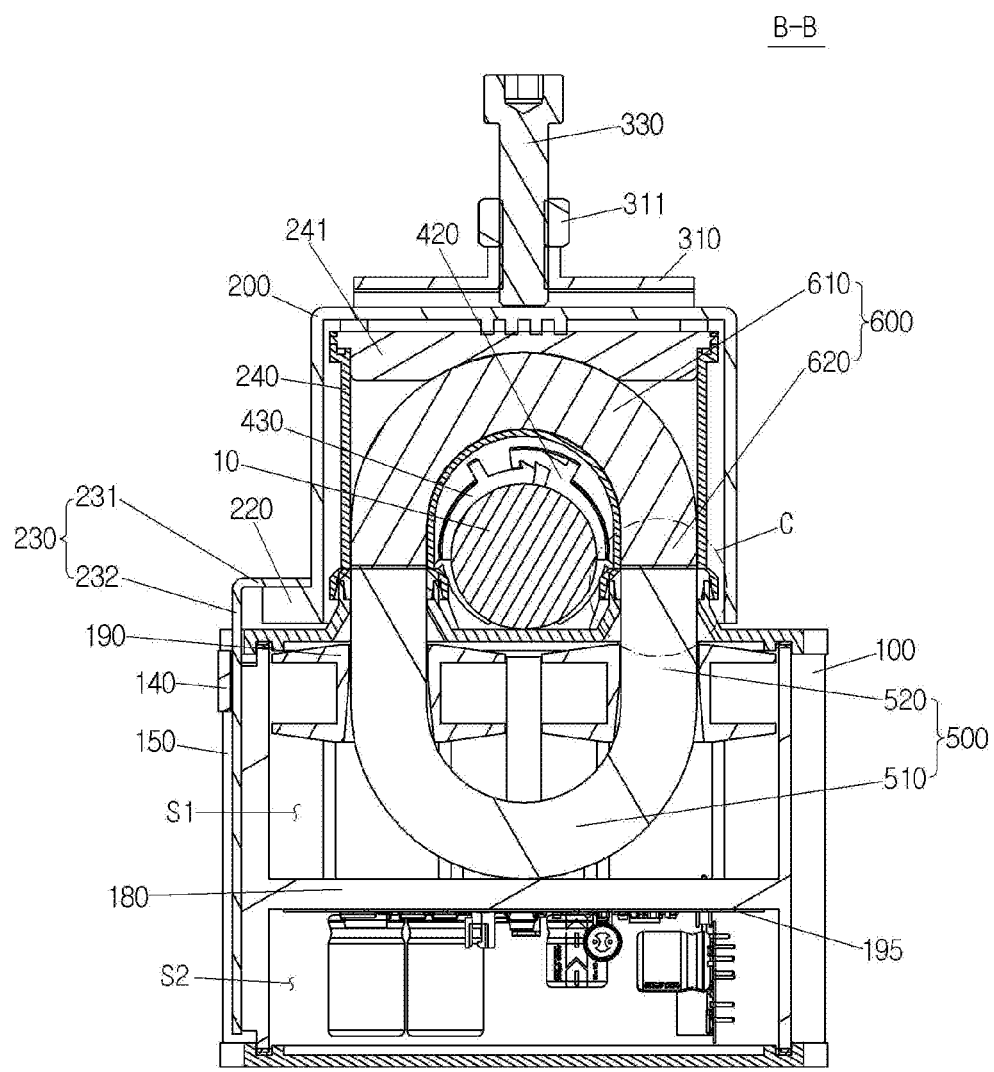

[FIG. 6]
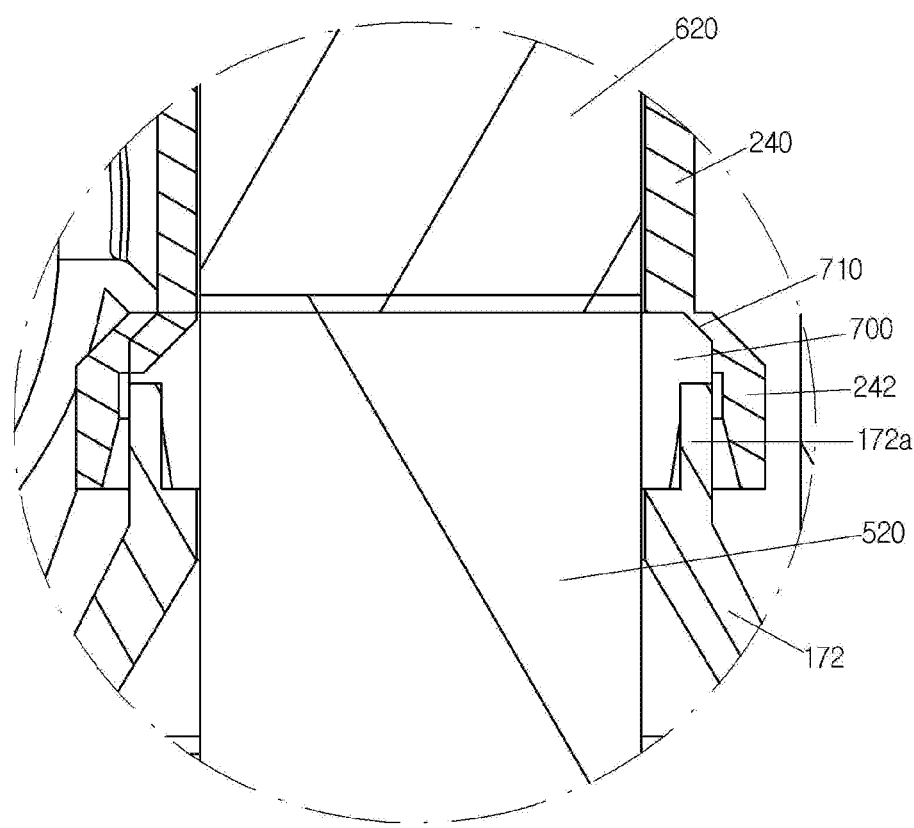

[FIG. 7]
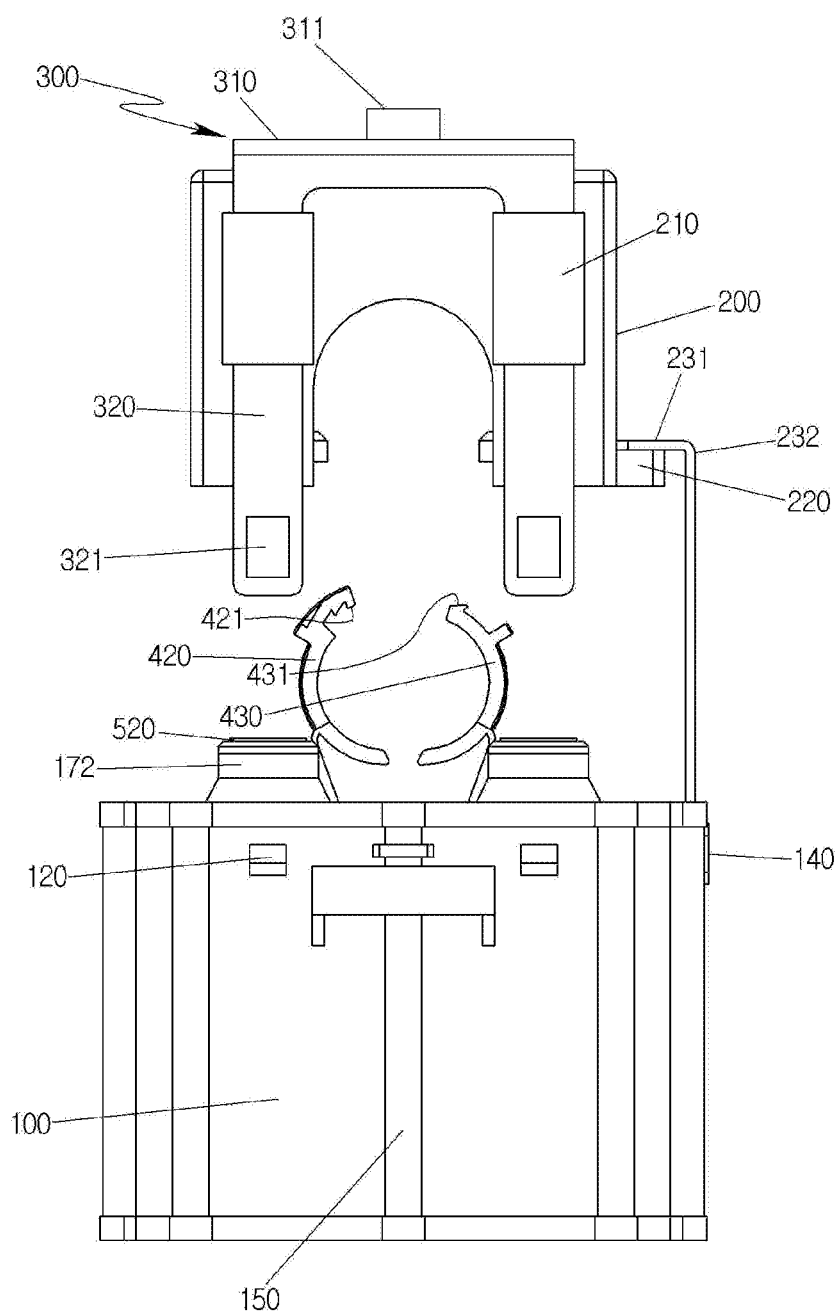

[FIG. 8]
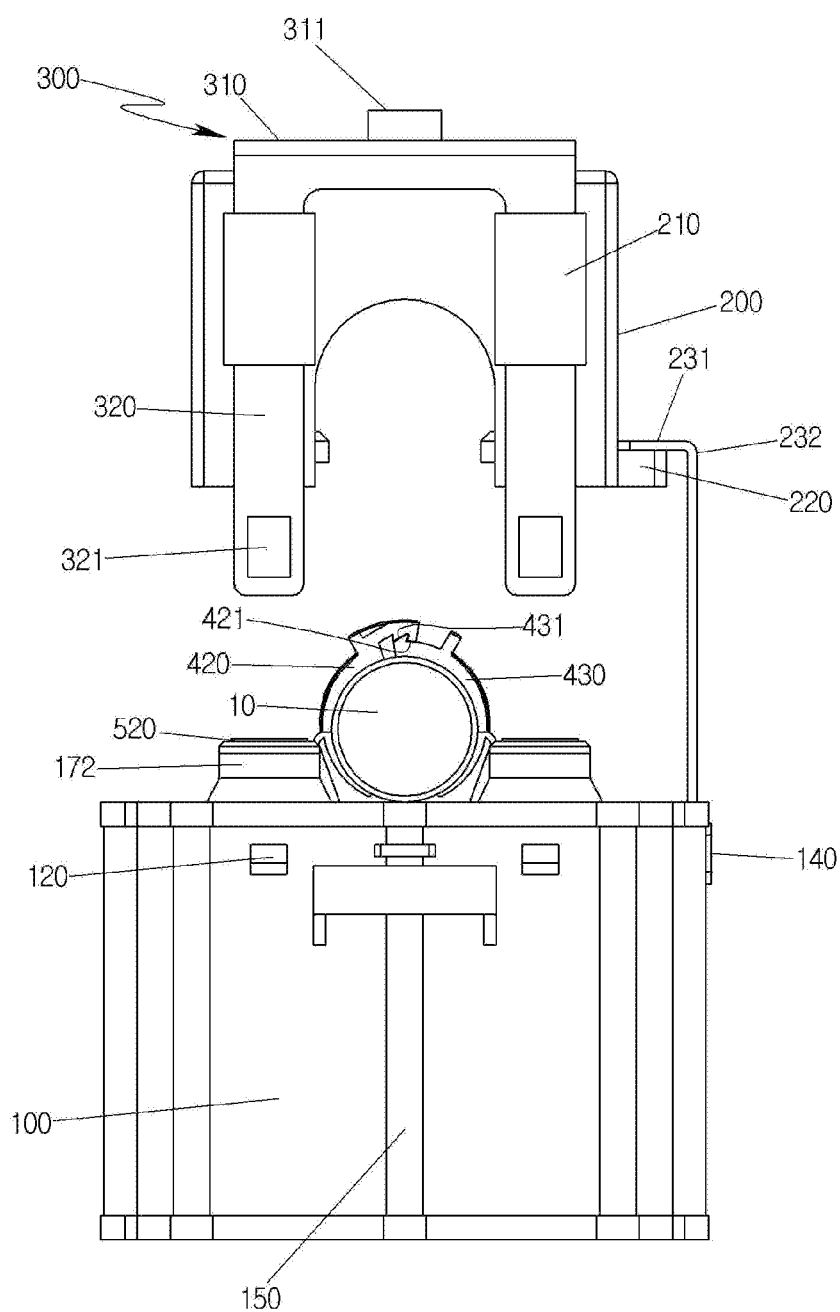

[FIG. 9]
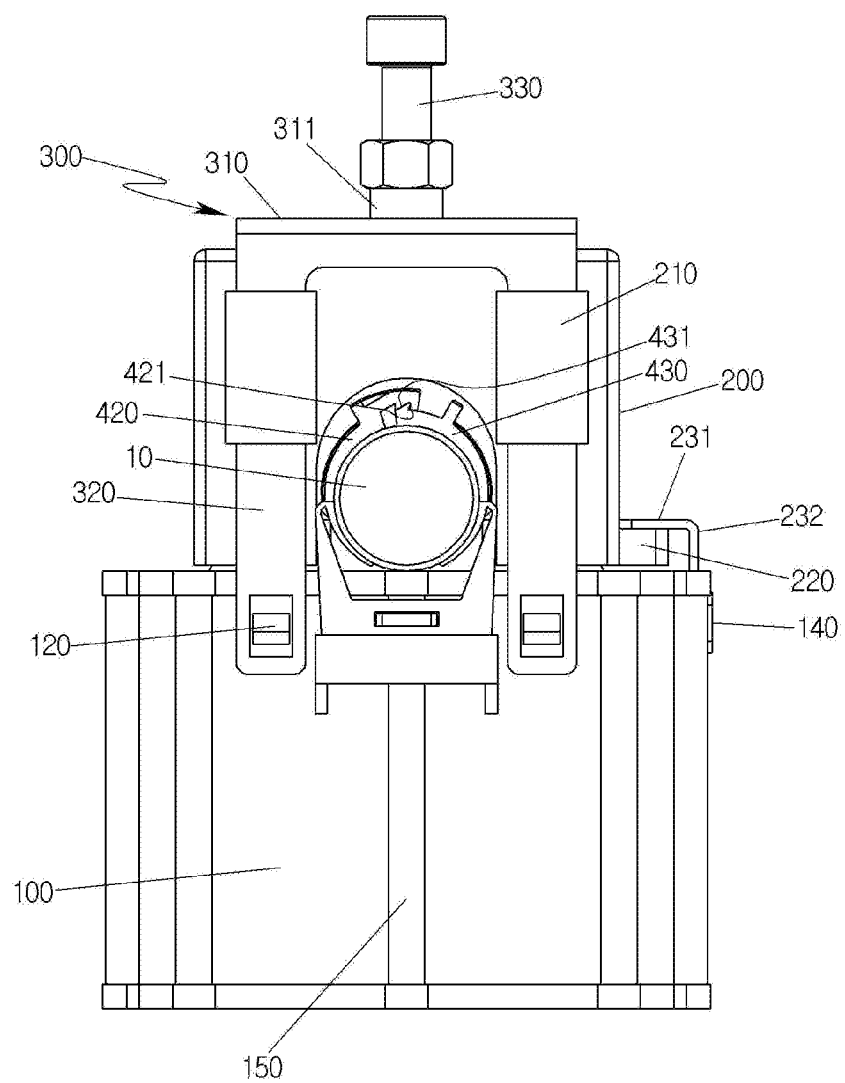

ELECTROMAGNETIC INDUCTIVE POWER SUPPLY APPARATUS

CROSS-REFERENCE TO RELATED APPLICATIONS

This application is a National Stage of International patent application PCT/KR2018/010700, filed on Sep. 12, 2018, 2018, which claims priority to foreign Korean patent application No. KR 10-2017-0118293, filed on Sep. 15, 2017, the disclosures of which are incorporated by reference in their entirety.

FIELD OF THE INVENTION

The present disclosure relates to an electromagnetic inductive power supply apparatus, and more particularly, an electromagnetic inductive power supply apparatus which may supply an induced current to a power supply unit by using an induction phenomenon of the magnetic field generated nearby by a current flowing in a line.

BACKGROUND

Recently, as the interest in a power supply method using the magnetic induction phenomenon increases, various types of electromagnetic inductive power supply apparatuses are being developed.

In general, the electromagnetic inductive power supply apparatus based on a current transformer may be installed to a power link through which a large capacity current flows, such as a power line or a bus bar, to induce a current from the power link, and generates power by using the induced current to supply the power as the operating power source of a device requiring the power.

That is, the electromagnetic inductive power supply apparatus is installed to the power link through which a large capacity current flows, such as a transmission line or a distribution line, and converts the power acquired through the magnetic induction phenomenon into a direct current to supply the direct current to a load.

It is necessary to facilitate the installation work to the power link, the maintenance work, and the like for such an electromagnetic inductive power supply apparatus. In addition, it is necessary to accurately align and couple cores, accommodated within a housing, in the installation and maintenance work of the magnetic inductive power supply apparatus.

SUMMARY OF THE INVENTION

An object of an embodiment of the present disclosure is to provide an electromagnetic inductive power supply apparatus which is easily mounted to a line while minimizing the use of a tool.

In addition, another object of an embodiment of the present disclosure is to provide an electromagnetic inductive power supply apparatus which may automatically align a core when mounted to the line.

In addition, still another object of an embodiment of the present disclosure is to provide an electromagnetic inductive power supply apparatus which may minimize the loss of power after being mounted to the line.

An electromagnetic inductive power supply apparatus according to an embodiment of the present disclosure includes a lower housing, an upper housing disposed above the lower housing and having an elevating guide and an opening, through which a line passes, when closely contacting the lower housing, a pressing support having a base disposed above the upper housing and a first guide bar disposed below the base configured to guide the elevation of the elevating guide, the first guide bar having one end fastened to the lower housing, a lower core installed within the lower housing, and an upper core installed within the upper housing and configured to form a magnetic circuit inner space, through which the line passes, when the upper core is connected with the lower core.

In an embodiment of the present disclosure, the base may be coupled with a pressing member, and the pressing member may press the upper housing to the lower housing side.

In an embodiment of the present disclosure, the pressing member may include a fastening nut provided at the center of the base and a pressing bolt coupled to the fastening nut by a screw and configured to press the upper housing.

In an embodiment of the present disclosure, a hook may be provided in the lower housing, and a hook hole coupled with the hook may be formed in one end of the first guide bar.

In an embodiment of the present disclosure, a guide rail may be provided vertically in the lower housing, and a second guide bar correspondingly coupled to the guide rail to be elevated may be provided in the upper housing.

In an embodiment of the present disclosure, the lower housing may include a detachment prevention member for preventing the second guide bar from being detached.

In an embodiment of the present disclosure, the detachment prevention member may be disposed on the upper end of the guide rail.

In an embodiment of the present disclosure, a partition plate may be provided horizontally inside the lower housing, and the inside of the lower housing may be partitioned into an upper space and a lower space by the partition plate.

In an embodiment of the present disclosure, a lower core may be accommodated in the upper space, and a printed circuit board may be accommodated in the lower space.

In an embodiment of the present disclosure, the lower housing may have an opened lower surface, and a lower cover may be coupled to the lower surface of the lower housing.

In an embodiment of the present disclosure, at least one first fastening part may be formed on the circumference of the lower housing, and a second fastening part may be formed on the lower cover to correspond to the first fastening part.

In an embodiment of the present disclosure, the lower housing may have an opened upper surface, and an upper cover may be coupled to the upper surface of the lower housing.

In an embodiment of the present disclosure, at least one first fastening part may be formed on the circumference of the lower housing, and a second fastening part may be formed on the upper cover to correspond to the first fastening part.

In an embodiment of the present disclosure, the upper cover may have a core support part protruding upward, and the upper surface of the core support part may be opened so that the end portion of the lower core is exposed.

According to an embodiment of the present disclosure, the upper housing may be fastened to the lower housing while sliding vertically above the lower housing, thereby providing the fastening force therebetween at the uniform pressure even while minimizing the use of the tool.

According to an embodiment of the present disclosure, the upper housing may slide to the lower housing side to be fastened to the lower housing, thereby automatically aligning the lower core accommodated within the lower housing with the upper core accommodated within the upper housing.

According to an embodiment of the present disclosure, the line may be easily and stably fixed by a plurality of line clamps provided on the lower support.

According to an embodiment of the present disclosure, a sealing member may be provided between the lower housing and an inner housing which surround the outside of the lower core and the upper core when the lower core and the upper core are connected with each other, thereby preventing foreign matters, such as rainwater, from being introduced from the outside.

BRIEF DESCRIPTION OF THE DRAWINGS

FIG. 1 is a schematic diagram showing a state where an electromagnetic inductive power supply apparatus has been generally installed to a line.

FIG. 2 is a perspective diagram showing an electromagnetic inductive power supply apparatus according to an embodiment of the present disclosure.

FIG. 3 is an exploded perspective diagram showing the electromagnetic inductive power supply apparatus according to an embodiment of the present disclosure.

FIG. 4 is a cross-sectional diagram taken along line "A-A" of FIG. 2.

FIG. 5 is a cross-sectional diagram taken along line "B-B" of FIG. 2.

FIG. 6 is a detailed diagram showing a portion "C" of FIG. 5.

FIGS. 7 to 9 are front diagrams showing an assembling process of the electromagnetic inductive power supply apparatus according to an embodiment of the present disclosure.

DETAILED DESCRIPTION

Hereinafter, embodiments of the present disclosure will be described in detail with reference to the accompanying drawings so that those skilled in the art may easily carry out the present disclosure. The present disclosure may be implemented in various different forms and is not limited to the embodiments described herein.

In order to clearly describe the present disclosure, detailed descriptions of parts unrelated to the essence of the present disclosure may be omitted, and the same reference numerals may be denoted by the same or like components throughout the specification.

In addition, when a certain part is said to "comprise" a certain component, this means that it may further include other components, rather than excluding other components unless particularly stated otherwise. The terminology used herein is for the purpose of describing specific embodiments only and is not intended to limit the present disclosure, and may be construed as a concept understood by those skilled in the art to which the disclosure pertains, unless otherwise defined in the specification.

Referring to FIGS. 2 and 3, an electromagnetic inductive power supply apparatus according to an embodiment of the present disclosure includes a lower housing 100 and an upper housing 200, and the upper housing 200 may be coupled to and separated from the lower housing 100 in a vertical direction.

The lower housing 100 may be formed in a substantially hexahedron, and the lower surface and the upper surface of the lower housing 100 may be opened. A lower cover 160 may be coupled to the opened lower surface of the lower housing 100. A plurality of first fastening parts 150 may be formed on the circumference of the lower housing 100, and a second fastening part 161 may be formed on the lower cover 160 to correspond to the first fastening part 150. A screw hole is formed in each of the first fastening part 150 and the second fastening part 161, and the lower housing 100 and the lower cover 160 may be coupled to each other by fastening a fastening member, such as a screw, to each screw hole.

An upper cover 170 may be coupled to the opened upper surface of the lower housing 100. A third fastening part 171 may be formed on the upper cover 170 to correspond to the first fastening part 150. A screw hole is formed in the third fastening part 171 to correspond to the screw hole of the first fastening part 150, and a fastening member such as a screw is fastened to each screw hole, such that the lower housing 100 and the upper cover 170 may be coupled with each other.

A core support part 172 may be formed to protrude upward from the upper cover 170. In an embodiment, two core support parts 172 may be provided on the upper cover 170. Each core support part 172 has the opened upper surface. Each core support part 172 may be disposed with a first extension part 520 of a lower core 500 to be described later, and the end portion of the lower core 500 may be exposed to the upper surface of the opened core support part 172.

The lower housing 100 may be provided with a clamp pedestal 110 onto which a line clamp 400 is seated and fixed. The clamp pedestal 110 may be formed in the form of a flat plate having a predetermined thickness, and may be provided on each of the front surface and the rear surface of the lower housing 100. A hook 120 may be formed on the front surface of the lower housing 100. The hook 120 may be provided symmetrically at both sides of the clamp pedestal 110. The hook 120 may be coupled to a hook hole 321 of a pressing support 300 to be described later. A guide rail 130 may be provided on one side surface of the lower housing 100. The guide rail 130 guides the ascent and descent of the upper housing 200 with respect to the lower housing 100.

The upper housing 200 is coupled above the lower housing 100. The upper housing 200 may be formed in a substantially hexahedron. The upper housing 200 has a space to accommodate an upper core 600 therein. The upper housing 200 may be opened downward, that is, in a direction coupled to the lower housing 100, and the upper core 600 and the like may be accommodated within the upper housing 200 through the opened lower side direction.

An opening may be formed in each of the front surface and the rear surface of the upper housing 200. A line 10 may be installed by passing through the upper housing 200 through the opening. The opening may be formed to correspond to the shape of the line 10. For example, since the line 10 is typically formed by being surrounded by a cylindrical covering material, the opening may also be formed in a substantially semi-circular shape to correspond to the cylindrical covering material.

An elevating guide part 210 is provided on the front surface of the upper housing 200. The elevating guide part 210 guides the ascent and descent of the upper housing 200 along the pressing support 300 to be described later. The elevating guide parts 210 are disposed symmetrically at both sides of the opening, and a slide hole is formed vertically in the elevating guide part 210.

The pressing support 300 may guide the ascent and descent of the upper housing 200. That is, the pressing support 300 may guide the bottom surface of the upper housing 200 to ascend and descent in parallel with the upper surface of the lower housing 100. The pressing support 300 may be made of a metal material to have sufficient strength and durability for fastening and separating a pressing bolt during maintenance. The pressing support 300 may include a base 310 and a first guide bar 320.

The base 310 may be formed of a substantially rectangular flat plate. The base 310 may be located above the upper housing 200. An adjusting hole may be formed in the center of the base 310. A pressing member 330 may be coupled to the adjusting hole. As the pressing member 330, a pressing bolt may be applied. When the pressing bolt rotates in one side direction with being supported by the base 310, the pressing bolt may press the upper housing 200 downward by contacting the upper surface of the upper housing 200. The base 310 may be provided with a fastening nut 311 which may be fastened to the pressing bolt.

The first guide bar 320 may be provided in pairs at each of the front and rear of the base 310. Each first guide bar 320 is inserted into and coupled to a slide hole of the elevating guide part 210 of the upper housing 200, and the ascent and descent of the upper housing 200 may be guided by the first guide bar 320 inserted into and coupled to the elevating guide part 210. The hook hole 321 is formed below the first guide bar 320, and the hook hole 321 may be correspondingly coupled to the hook 120 of the lower housing 100. The vertical length of the hook hole 321 may be formed longer than the vertical thickness of the hook 120.

The upper housing 200 may include a second guide bar 230. A protrusion part 220 may be formed on one side surface of the upper housing 200, and the second guide bar 230 may be fixedly coupled to the protrusion part 220. The second guide bar 230 may be coupled to the guide rail 130 of the lower housing 100 to guide the ascent and descent of the upper housing 200. The second guide bar 230 includes a fixing part 231 and an elevating part 232. The fixing part 231 may be located on the upper surface of the protrusion part 220, and may be fixedly coupled to the protrusion part 220 by using a fastening member such as a bolt. The elevating part 232 may be bent downward from one end of the fixing part 231. The elevating part 232 may be formed with a guide groove vertically and lengthily. The guide groove of the elevating part 232 is coupled to the guide rail 130 of the lower housing 100. Accordingly, the elevating part 232 may ascend or descend along the guide rail 130 of the lower housing 100.

In an embodiment of the present disclosure, the upper housing is configured to be fastened to the lower housing while moving vertically above the lower housing, but a different fastening method may also be applied. For example, a hinge unit may be coupled to one side of each of the upper housing 200 and the lower housing 100, and the upper housing 200 may also be configured to be pivotally operated with respect to the lower housing 100. However, if the upper housing 200 and the lower housing 100 are fastened in such a pivot structure, it is not easy to provide uniform pressure to each fastening surface. Accordingly, as in an embodiment of the present disclosure, it is possible to allow the entire upper housing 200 to be fastened to the lower housing 100 while moving vertically above the lower housing 100, thereby providing a uniform fastening force over the entire portion closely contacting each other.

Referring to FIGS. 4 and 5, the lower core 500 and the upper core 600 are accommodated in the lower housing 100 and the upper housing 200, respectively.

A partition plate 180 may be coupled to the inside of the lower housing 100. The partition plate 180 may be provided horizontally with respect to the upper cover 170 and the lower cover 160 inside the lower housing 100. Accordingly, the inside of the lower housing 100 may be partitioned into an upper space and a lower space by the partition plate 180.

The lower core 500 may be disposed in the upper space of the lower housing 100 partitioned by the partition plate 180. The lower core 500 may have the cross section having an approximately "∪" shape. That is, the lower core 500 may include a first curved part 510 which is convex downward, and a pair of first extension parts 520 extending upward in parallel with each other at both ends of the first curved part 510. The end portion of the first extension part 520 may be exposed upward from the core support part 172 of the upper cover 170.

A bobbin is provided in the upper space of the lower housing 100 to surround the first extension part 520 of the lower core 500. Two bobbins may be installed in the upper space to surround the pair of first extension parts 520 formed at both ends of the curved part of the lower core 500 having an "∪" shape. That is, a core hole may be formed in the center of each bobbin so that both ends of the core are inserted. An induction coil is wound around the outer circumferential surface of the bobbin at an arbitrary number of turns.

The induction coil may generate an induced electromotive force by an alternating magnetic flux formed through a magnetic circuit. One end of the induction coil may be connected to a power supply unit of a printed circuit board 190 to be described later. That is, the induced electromotive force generated in the induction coil may be provided to the power supply unit.

The printed circuit board 190 and the like may be disposed in the lower space of the lower housing 100 partitioned by the partition plate 180. The printed circuit board 190 may be provided with the power supply unit, a power converter, and the like.

The power supply unit may serve to supply power to an electrical and electronic device by using, as an input, the induced electromotive force supplied from an induction electromotive force generator. That is, the power supply unit may receive an induced current induced by electromagnetic induction and then convert the induced current to a DC voltage having a desired magnitude to output the converted induced current. To this end, the power supply unit may include a power converter for receiving the induced current output from the induction coil and converting the induced current. The number of power converters may be changed. That is, the power converter within the power supply unit may be attached and detached according to the magnitude of the power required by the load so that the proper power required by the device requiring the power may be output.

The upper core 600 is accommodated inside the upper housing 200. The upper core 600 may have the cross section having a substantially "∩" shape. That is, the upper core 600 may include a second curved part 610 which is convex upward and a pair of second extension parts 620 extending downward in parallel to each other at both ends of the second curved part 610. The end portion of the second extension part 620 may be exposed downward from the upper housing 200. The exposed second extension part 620 of the upper core 600 may be connected to the first extension part 520 of the lower core 500 exposed upward from the lower housing 100 when the lower housing 100 and the upper housing 200 are coupled.

The lower core 500 and the upper core 600 are physical objects which become magnetic passages of the magnetic flux generated by the current flowing in a line. If the first extension part 520 of the lower core 500 and the second extension 620 of the upper core 600 are connected, a magnetic circuit capable of generating an induced electromotive force is formed. The magnetic circuit serves to generate an electromotive force by the electromagnetic induction of the current flowing in the line.

When the lower core 500 and the upper core 600 are connected, an approximately elliptical magnetic circuit is formed, and a magnetic circuit inner space is formed therein. The line 10 may pass through the magnetic circuit inner space. The length of the first extension part 520 of the lower core 500 may be formed longer than the length of the second extension part 620 of the upper core 600. That is, the area of the lower core 500 may be formed wider than the area of the upper core 600. Accordingly, the overall center of gravity of the electromagnetic inductive power supply apparatus may be located below to maintain a stable installation state of the electromagnetic inductive power supply apparatus.

The line clamp 400 serves to fix the line. The line clamp 400 includes a support part 410, a first clamp 420, and a second clamp 430. The support part 410 may be formed in a substantially flat plate shape, and may be fixed on the clamp pedestal 110 of the lower housing 100. The support part 410 supports the first clamp 420 and the second clamp 430.

The first clamp 420 and the second clamp 430 may be formed in a semi-circular shape. The first clamp 420 and the second clamp 430 may be disposed on the base in a direction opposite to each other. If the first clamp 420 and the second clamp 430 are coupled to each other, the first clamp 420 and the second clamp 430 may have circular cross sections to correspond to the shape of the line. A first fastening protrusion may protrude from one end inner surface of the first clamp 420, and a second fastening protrusion may protrude from one end outer surface of the second clamp 430 to be interconnected with the first fastening protrusion.

Referring to FIGS. 5 and 6, the two core support parts 172 are formed to protrude upward from the upper cover 170 coupled to the opened upper surface of the lower core 500. A sealing support part 172a may be provided at the upper end of the core support part 172. The diameter of the sealing support part 172a may be formed larger than the diameter of the core support part 172. Accordingly, a space may be formed between the end portion of the lower core 500 exposed upward from the core support part 172 and the sealing support part 172a, and a sealing member 700 may be provided in the space. The sealing member 700 may seal between the core support part 172 to which the end portion of the lower core 500 is exposed and an inner housing 240 to which the end portion of the upper core 600 is exposed, thereby preventing the foreign matters, such as rainwater, from being introduced between the core support part 172 and the inner housing 240 from the outside. As the sealing member 700, an O-ring made of rubber or silicon may be used.

The inner housing 240 corresponding to the shape of the upper core 600 may be provided inside the upper housing 200. The upper surface and the lower surface of the inner housing 240 may be opened. An inner cover 241 may be detachably coupled to the opened upper surface of the inner housing 240.

The upper core 600 may be coupled to the inside of the inner housing 240, and the inner housing 240 may be coupled to the inside of the upper housing 200 by using a fastening member such as a bolt. At this time, a plurality of pressing protrusions 250 may protrude downward from the bottom surface of the upper plate of the upper housing 200. That is, if the pressing bolt presses the upper plate of the upper housing 200 downward, the pressing protrusion 250 of the upper housing 200 may press the inner housing 240 downward. Accordingly, the upper core 600 coupled to the inside of the inner housing 240 may be connected to the upper end of the lower core 500 accommodated in the lower housing 100.

The lower end of the upper core 600 may be exposed to the lower surface of the inner housing 240, and an enlarged tubular part 242 having the outer diameter larger than the outer diameter of the sealing support part 172a may be provided at the lower end of the inner housing 240. An inclined part 243 may be provided between the lower portion of the inner housing 240 and the enlarged tubular part 242. Accordingly, when the lower housing 100 and the upper housing 200 are coupled, the enlarged tubular part 242 of the inner housing 240 may press the sealing member 700 downward while accommodating the outside of the sealing support part 172a. At this time, the lower housing 100 and the inner housing 240 may be sealed at sufficient pressure while pressing the sealing member 700 in the inclined direction by the inclined part 243 as well as in the vertical direction when pressing downward from the inner housing 240.

The assembling process of the electromagnetic inductive power supply apparatus according to an embodiment of the present disclosure configured as described above will be described with reference to FIGS. 7 to 9.

First, an operator disposes the electromagnetic inductive power supply apparatus to correspond to the installation position of the line 10. At this time, as shown in FIG. 7, the upper housing 200 may be disposed to be spaced at a predetermined height apart from the lower housing 100 upward. That is, the pressing support 300 coupled to the upper housing 200 may be separated from the hook 120 of the lower housing 100. Since the second guide bar 230 of the upper housing 200 is restrained by a detachment prevention member 140 of the lower housing 100, the upper housing 200 and the lower housing 100 may be prevented from being completely separated from each other.

The line clamp 400 is provided on the clamp pedestal 110 of the lower housing 100, and the first clamp 420 and the second clamp 430 of the line clamp 400 are supported by the support part 410 with being separated from each other.

Thereafter, if the line is accommodated in the line clamp 400 as shown in FIG. 8, the operator engages the first clamp 420 and the second clamp 430 with each other so that the line 10 may be accommodated between the first clamp 420 and the second clamp 430.

That is, if the line is introduced between the first clamp 420 and the second clamp 430, the operator may rotate one end of the first clamp 420 and one end of the second clamp 430, which are by the base, to be closer to each other. Accordingly, the line clamp 400 clamps the line easily and stably while a first latching protrusion 421 formed on one end inside surface of the first clamp 420 and a second latching protrusion 431 formed on one end outside surface of the second clamp 430 are coupled to each other. The line is fixed by the line clamp 400, such that the line and the cores may be disposed to be spaced at a predetermined interval apart from each other.

As shown in FIG. 9, if the operator presses the upper housing 200, the upper housing 200 moves vertically to the lower housing 100 side. At this time, the second guide bar 230 provided on one side surface of the upper housing 200 slides along the guide rail 130 of the lower housing 100, such that the bottom surface of the upper housing 200 may descend in parallel with respect to the upper surface of the lower housing 100.

If the upper housing 200 descends, the pressing support 300 provided in the upper housing 200 also descends to the lower housing 100 side. If the pressing support 300 descends and the second guide part of the pressing support 300 is located on the hook 120 of the lower housing 100, the operator may couple the hook hole 321 formed in the lower portion of the second guide part and the hook 120 of the lower housing 100 to each other.

Next, the operator may closely contact the upper housing 200 with the lower housing 100 by rotating the adjusting bolt, provided above the pressing support 300, in one side direction to press the upper housing 200 downward. At this time, the upper housing 200 slides along the second guide part of the pressing support 300, such that the bottom surface of the upper housing 200 descends in parallel with the upper surface of the lower housing 100. In addition, the adjusting bolt may press the center of the upper surface of the upper housing 200 in the center of the base of the pressing support 300, thereby providing the uniform pressing force to the entire upper housing 200.

As described above, if the upper housing 200 is coupled onto the lower housing 100, the first extension part 520 of the lower core 500 exposed upward from the lower housing 100 and the second extension part 620 of the upper core 600 exposed downward from the upper housing 200 are automatically aligned and connected. That is, the lower end of the inner housing 240 surrounding the end portion of the second extension part 620 surrounds the outside of the core support part 172 surrounding the end portion of the first extension part 520, and accordingly, the alignment between the lower core 500 and the upper core 600 is automatically executed, and the lower end of the inner housing 240 may press the sealing member 700 provided at the outside of the end portion of the core support part, thereby implementing the sealing between the lower core 500 and the upper core 600.

If the upper core 600 and the lower core 500 are connected to form a magnetic circuit, the line is disposed to pass through the magnetic circuit inner space, and an alternating current flows on the line, a magnetic flux is generated inside the upper core 600 and the lower core 500 by an electromagnetic induction law. If the magnetic flux is generated inside the upper core 600 and the lower core 500, the induced current is generated in the induction coil, wound around the outer circumferential surface of the bobbin mounted to the first extension part 520 of the lower core 500, in order to generate the magnetic flux in a direction for attenuating the magnetic flux generated inside the core by a Lenz's law. The induced current may be output to be used for the power source unit and the like.

As described above, when the electromagnetic inductive power supply apparatus according to an embodiment of the present disclosure is installed on the line, no separate tool is required except for the tool for rotating the adjusting bolt. That is, it is possible to install the electromagnetic inductive power supply apparatus stably and easily even while minimizing the use of the tool.

Meanwhile, the electromagnetic inductive power supply apparatus according to an embodiment of the present disclosure may be produced by using a synthetic resin material except for the pressing support 300. Accordingly, it is possible to minimize the interference in the magnetic induction method to prevent power leakage.

The invention claimed is:

1. An electromagnetic inductive power supply apparatus installed to a line, the electromagnetic inductive power supply apparatus comprising:
    a lower housing;
    an upper housing disposed above the lower housing and having an elevating guide and an opening, through which the line passes, when closely contacting the lower housing;
    a pressing support having a base disposed above the upper housing and a first guide bar disposed below the base and configured to guide the elevation of the elevating guide, the first guide bar having one end fastened to the lower housing;
    a lower core installed within the lower housing; and
    an upper core installed within the upper housing and configured to form a magnetic circuit inner space, through which the line passes, when the upper core is connected to the lower core.

2. The electromagnetic inductive power supply apparatus of claim 1,
    wherein the base is coupled to a pressing member, and the pressing member presses the upper housing to the lower housing side, and
    wherein the pressing member comprises:
    a fastening nut provided at the center of the base; and
    a pressing bolt coupled to the fastening nut by a screw and configured to press the upper housing.

3. The electromagnetic inductive power supply apparatus of claim 1,
    wherein a hook is provided in the lower housing, and a hook hole coupled to the hook is formed in one end of the first guide bar.

4. The electromagnetic inductive power supply apparatus of claim 1,
    wherein a guide rail is provided vertically in the lower housing, and a second guide bar coupled correspondingly to the guide rail to be elevated is provided in the upper housing.

5. The electromagnetic inductive power supply apparatus of claim 4,
    wherein the lower housing comprises a detachment prevention member configured to prevent the second guide bar from being detached.

6. The electromagnetic inductive power supply apparatus of claim 5,
    wherein the detachment prevention member is disposed on the upper end of the guide rail.

7. The electromagnetic inductive power supply apparatus of claim 1,
    wherein a partition plate is provided horizontally inside the lower housing, and the inside of the lower housing is partitioned into an upper space and a lower space by the partition plate.

8. The electromagnetic inductive power supply apparatus of claim 7,
    wherein a lower core is accommodated in the upper space, and a printed circuit board is accommodated in the lower space.

9. The electromagnetic inductive power supply apparatus of claim 1,
    wherein the lower housing has an opened lower surface, and a lower cover is coupled to the lower surface of the lower housing.

10. The electromagnetic inductive power supply apparatus of claim 9,
wherein at least one first fastening part is formed on the circumference of the lower housing, and a second fastening part is formed on the lower cover to correspond to the first fastening part.

11. The electromagnetic inductive power supply apparatus of claim 1,
wherein the lower housing has an opened upper surface, and an upper cover is coupled to the upper surface of the lower housing.

12. The electromagnetic inductive power supply apparatus of claim 11,
wherein at least one first fastening part is formed on the circumference of the lower housing, and a second fastening part is formed on the upper cover to correspond to the first fastening part.

13. The electromagnetic inductive power supply apparatus of claim 11,
wherein the upper cover has a core support part protruding upward and configured to support the end portion of the lower core, and the upper surface of the core support part is opened so that the end portion of the lower core is exposed.

14. The electromagnetic inductive power supply apparatus of claim 13,
wherein a sealing support part having the diameter larger than the diameter of the core support part is provided on the end portion of the core support part, and a sealing member is provided between the end portion of the lower core and the sealing support part.

15. The electromagnetic inductive power supply apparatus of claim 14,
wherein an inner housing is provided inside the upper housing to accommodate the upper core, and an enlarged tubular part having the outer diameter larger than the outer diameter of the sealing support part is provided at the lower end of the inner housing.

16. The electromagnetic inductive power supply apparatus of claim 15,
wherein an inclined part is provided between the lower end of the inner housing and the enlarged tubular part.

17. The electromagnetic inductive power supply apparatus of claim 1, further comprising a line clamp coupled to the lower housing and configured to fix the line.

18. The electromagnetic inductive power supply apparatus of claim 17,
wherein a clamp pedestal configured to support the line clamp is provided on the lower housing.

19. The electromagnetic inductive power supply apparatus of claim 18,
wherein the line clamp comprises:
a support part fixed to the clamp pedestal;
a first clamp rotatably coupled to one side of the support part; and
a second clamp rotatably coupled to the other side of the support part and disposed opposite to the first clamp.

20. The electromagnetic inductive power supply apparatus of claim 1,
wherein the lower core and the upper core are disposed to be spaced apart from the line.

* * * * *